United States Patent [19]

van de Leemput et al.

[11] Patent Number: 4,458,028

[45] Date of Patent: Jul. 3, 1984

[54] PROCESS FOR PREPARING A POLYMERIZATION CATALYST AND PREPARATION OF ETHYLENE POLYMERS WITH THIS CATALYST

[75] Inventors: Lambertus J. M. A. van de Leemput, Echt; Godefridus A. H. Nooijen, Helden-Panningen, both of Netherlands

[73] Assignee: Stamicarbon B.V., Geleen, Netherlands

[21] Appl. No.: 405,373

[22] Filed: Aug. 5, 1982

[30] Foreign Application Priority Data

Aug. 6, 1981 [NL] Netherlands ................ 8103702

[51] Int. Cl.$^3$ .............................................. C08F 4/68
[52] U.S. Cl. ................................... 502/104; 502/113; 526/114
[58] Field of Search ............... 252/429 B, 429 C, 430, 252/431 R, 431 C; 502/104, 113

[56] References Cited

U.S. PATENT DOCUMENTS

| | | | |
|---|---|---|---|
| 4,146,695 | 3/1979 | van de Leemput | 252/430 X |
| 4,209,603 | 6/1980 | van de Leemput | 252/430 X |
| 4,284,527 | 8/1981 | Pullukat et al. | 252/430 |
| 4,285,834 | 8/1981 | Lowery et al. | 252/429 C |
| 4,382,020 | 5/1983 | van de Leemput | . |

FOREIGN PATENT DOCUMENTS

| | | |
|---|---|---|
| 39971 | 11/1981 | European Pat. Off. . |
| 1433052 | 4/1976 | United Kingdom . |
| 1575352 | 9/1980 | United Kingdom . |

*Primary Examiner*—Patrick Garvin
*Attorney, Agent, or Firm*—Cushman, Darby & Cushman

[57] ABSTRACT

This invention relates to a process for forming a catalyst containing chromium and vanadium, by depositing chromium- and vanadium compounds on an inert, particulate inorganic support. The chromium is deposited as a complex of a chromium compound that may be a chromium-1,3-diketocompound with a Group II or III element hydrocarbyl. The vanadium compound can be but need not be a complex of a vanadium compound with a Group II or III element. Not more than one of the chromium- and a vanadium compounds may be the chelate of a 1.3-diketo-compound, whether or not complexed with a Group II or III element hydrocarbyl. The process for polymerizing an olefin using the catalysts of the invention is also disclosed.

6 Claims, No Drawings

PROCESS FOR PREPARING A POLYMERIZATION CATALYST AND PREPARATION OF ETHYLENE POLYMERS WITH THIS CATALYST

BACKGROUND AND SUMMARY OF THE INVENTION

This invention relates to a process for preparing a chromium-containing catalyst for the polymerization of olefins. Such catalysts are prepared by applying to an inert inorganic particulate support a complex formed between a chromium compound and at least one organometallic compound of a metal of Group II or III of the Periodic Table wherein hydrocarbyl groups having 1–20 carbon atoms are bonded to said Group II or III metal.

The present invention also relates to the polymerization of α-olefins having 2–8 carbon atoms, optionally together with amounts not exceeding 15 mole % of one or more other α-olefins having with 2–15 carbon atoms, particularly to the polymerization of ethylene optionally with up to 15 mole % of one or more α-olefins having 3–12 carbon atoms.

Similar processes are known from U.S. Pat. No. 4,146,695.

The polymerization of olefins, in particular ethylene, with supported chromium oxide type catalysts, has been known for a long time. Such polymerizations can be carried out as 'solution processes', yielding polymer as a solution in the solvent used for the polymerization as described, for example, in U.S. Pat. No. 2,825,721. The polymerization of ethylene with a supported chromium oxide type catalyst can also be carried out as a 'suspension process', in which the ethylene polymer product is precipitated and is obtained as a suspension as described, for example, in U.S. Pat. Nos. 2,825,721 and 3,087,917. Solution polymerizations are generally carried out at temperatures of at least 120° C., whereas suspension polymerizations are carried out at temperatures of at most 110° C.

Suspension polymerizations yield mostly ethylene polymers with very low melt indices, i.e. high molecular weights. The molecular weight increases as the polymerization temperature is reduced. Thus, there are many catalysts of the supported chromium oxide type which are very suitable for application to the solution process at temperatures of, for example, 140° C. or higher, but which in a suspension process will only yield high-molecular weight polymer.

It has generally been known for a long time that the polymer molecular weight can be reduced with molecular weight control agents, the most commonly used of which is hydrogen. Many supported chromium oxide type catalysts, however, show only slight sensitivity to hydrogen, thus requiring in a suspension process large quantities of hydrogen to obtain desired polymer molecular weights. This large amount of added hydrogen strongly reduces the effectiveness of the catalyst. Lower yields of polymer are obtained and large quantities of hydrogen must be recycled with only small quantities of monomer.

Economically, such suspension methods are very unattractive and are technically difficult to implement. On the other hand, a suspension process in general does have certain advantages over a solution process. Accordingly, there is a need for catalysts which can be used in a suspension process to prepare ethylene polymers having lower molecular weights, and which have improved sensitivity to temperature and to hydrogen.

Presently, the variation in polymer molecular weight distribution as a function of temperature differs widely from catalyst to catalyst. With many catalysts the polymer molecular weight distribution varies relatively little with temperature. Other catalysts display a much stronger temperature influence, and it is with these catalysts that the molecular weight can generally be considerably influenced through the choice of the polymerization temperature. In using these catalysts it is desirable that the introductin of only limited quantities of hydrogen will bring about a distinct reduction in molecular weight.

Efforts are now generally being made to find methods of influencing the molecular weights of ethylene polymers by modification of supported chromium oxide type catalysts. For instance, UK Patent Specification No. 1,231,322 and U.S. Pat. Nos. 3,812,058, 3,862,104, 3,900,457 and 3,974,101 state that the melt index of ethylene polymers is a function of both the method of preparation of the silica support and of the activation of the supported chromium oxide by heating, such that by a suitable choice of temperature, polyethylene with higher melt indices can be prepared in a suspension process.

Applicant's copending U.S. patent application Ser. No. 261,738, filed May 7, 1982, and now U.S. Pat. No. 4,382,020 discloses a chromium/vanadiam catalyst which can be used for solution polymerization as well as for suspension polymerization. Said catalyst is formed by reacting a chromium-1,3-diketo compound and a vanadium or vanadyl chelate of a 1,3-diketo compound, either separately or jointly, with an organometallic compound of a metal of Group II or III of the Periodic System, wherein hydrocarbyl groups having 1–20 carbon atoms are bonded to the Group II or Group III metal through a carbon atom, contacting the resulting reaction products with and depositing them on an inert inorganic particulate support, in particular silica, and heating the support (with the organometallic complexes of chromium and vanadium diketo compounds deposited thereon) in a non-reducing atmosphere at a temperature of 200° C. to 1200° C.

U.S. Pat. No. 3,635,840 describes catalysts obtained by combining supported chromium oxide with an organometallic compound and a vanadium-chelate or vanadylchelate of 1,3-diketone, and then heating the resulting product in an oxygen-containing gas at a temperature of 260° to 816° C. According to the example, vanadium acetyl acetonate is combined with triethyl aluminum, and a chromium oxide catalyst is impregnated therewith and then heated at 566° C. Ethylene is polymerized in the presence of this catalyst in cyclohexane at 145° C. and 148.3° C. Polyethylene having a melt index of 0.17 and 0.18, respectively, is then obtained.

Using the catalysts of said application Ser. No. 261,738, now U.S. Pat. No. 4,382,020, ethylene can be polymerized at about 100° C., under similar conditions, to yield a polyethylene with a melt index of about 0.2. In addition, the temperature sensitivity of such catalysts has proven to be considerably greater.

Using the catalyst disclosed by said U.S. Pat. No. 3,635,840, a difference in temperature of 3.3° C. will bring about a change in the melt index of no more than 0.01. With the catalyst according to application Ser. No. 261,738, now U.S. Pat. No. 4,382,020, on the other hand, the melt index can easily be varied to a considerable degree by small variations in temperature. In addition, these latter catalysts have a good hydrogen sensitivity. That is, the addition of limited quantities of hydrogen brings about a relatively substantial reduction of the molecular weight. However, it has now been found in this invention that an effective and advantageous supported chromium/vanadium catalyst component which upon activation with heat at a temperature of from 200° to 1200° C. will effect the polymerization of α-olefins can be prepared more simply by the present process comprising:

reacting in an inert solvent:

(1) a chromium compound selected from the group consisting of chromium carboxylates, chromiumhalides and chromium chelates of 1,3-diketocompounds and (2) an organo-metallic-compound of an element from Group II or III of the periodic system in which hydrocarbyl groups with 1-20 carbon atoms are bound via a carbon atom to the element, and forming a solution in an inert solvent of a vanadium component selected from the group consisting of vanadium halides, vanadium oxyhalides, vanadylesters having the formula VO(OR)$_3$, wherein R is a hydrocarbyl group, vanadium salts of carboxylic acids, vanadium chelates of 1.3-diketo compounds and the complexes obtained by reacting said vanadium compounds with an organo-metallic compound of an element from group II or III of the periodic system in which hydrocarbyl groups with 1-20 carbon atoms are bound via a carbon atom to the element, provided that not more than one of said chromium- and vanadium compounds is introduced in the form of a reaction product of a 1,3-diketocomplex with an organometallic compound of a group II or III element; and jointly or subsequently contacting the resulting solutions with and depositing the resulting chromium- and vanadium compounds on an inert inorganic supporting material, and separating from said solvent the resulting catalyst component comprising said chromium- and said vanadium materials deposited onto said support.

Suitable chromium compounds include, for example, 1,3-diketo chelate compounds such as chromium (III) chelates with acetyl acetonate, hexane-2,4-dione, heptane-2,4-dione, octane-2,4-dione, octane-3,5-dione and like compounds having up to 20 aliphatic carbon atoms. Also suitable are chromium salts of saturated or unsaturated aliphatic carboxylic acids such as propanoic, hexanoic, octanoic, decanoic, lauric, myristric, palmitic, stearic, arachidic, oleic, erucic, linoleic and linolenic acid. When a chromium halide is used it is preferably a chromium chloride. However when a vanadium 1,3-diketo chelate is used, a chromium-1,3,diketo chelate is not used.

The chromium compound is reacted with organometallic hydrocarbyl compounds of an element of Group II or III of the Periodic Table, in particular, beryllium, magnesium, boron, aluminum or gallium. The hydrocarbyl groups in these compounds are preferably alkyl groups having 1-20 carbon atoms.

Suitable organometallic compounds are in particular aluminum trialkyls, magnesium dialkyls and magnesium alkoxy alkyls. The alkyl moieties of the magnesium alkoxy alkyls and magnesium dialkyls advantageously contain 2-12 carbon atoms, preferably 4-8 carbon atoms. Suitable organomagnesium compounds include magnesium diethyl, ethylbutyl, dipropyl, diisopropyl, dibutyl, diisobutyl, butoxybutyl, diamyl, dihexyl, dioctyl, didecyl and didodecyl. Additionally, dicycloalkyl magnesium with identical or different cycloalkyl groups having 3-12 carbon atoms, preferably 5 or 6 carbon atoms, may also be employed. Moreover, an alkyl and a cycloalkyl group may be bonded to magnesium. Although alkyl or cycloalkyl magnesium compounds are preferred, magnesium aryls may also be used, notably diphenyl magnesium, as well as ditolyl and dixylyl magnesium.

The diaryl magnesium compounds are, however, insoluble, or only poorly soluble, in aliphatic hydrocarbons and, for that reason, are dissolved in aromatic hydrocarbons. The organomagnesium compounds may be prepared in a known manner (see, e.g., Organometallic Compounds; Vol. 1; G. E. Coates; M. L. H. Green and K. Wade; Organometallverbindungen; F. Runge). In particular, use may be made of solutions of magnesium alkyls prepared according to the process described in U.S. Pat. No. 3,737,393.

Suitable aluminum compounds include aluminum trialkyls and organoaluminum compounds having the general formula $(R_4)_2AlH$, where $R_4$ denotes an alkyl group having 1-10 carbon atoms. Aluminum compounds containing one or more radicals derived from a diene (as known from, for instance, GB No. 1,332,493 and U.S. Pat. Nos. 3,149,136 and 3,180,837 the disclosures of which are incorporated herein by reference) may also be employed.

The chromium compounds are reacted in an inert solvent with the organomagnesium or organoaluminum compound, or the organometallic compound of another element from Group II or III. This reaction is carried out in an inert solvent preferably in a hydrocarbon solvent, particularly preferred in one or more linear or branched aliphatic hydrocarbons such as butane, pentane, hexane, heptane, octane, decane, or the branched isomers, in a low-boiling gasoline consisting mainly of hexanes and/or heptanes, or in a higher boiling gasoline. Additionally, higher linear or branched saturated aliphatic hydrocarbons or mixtures thereof can be used as a solvent. Although a number of chromium compounds dissolve more readily in aromatic hydrocarbons than in aliphatic hydrocarbons, and can be reacted with magnesium diaryls that are soluble in aromatic hydrocarbons, it is generally desirable not to use aromatic hydrocarbon solvents whenever the process can be implemented adequately using aliphatic and/or cycloaliphatic solvents, particularly in view of the higher cost of aromatic hydrocarbon solvents and also because of the possible health/environmental dangers.

Most chromium compounds will therefore be dispersed in aliphatic and/or cycloaliphatic hydrocarbons due to their low solubility. Dissolution can be promoted by gentle heating at temperatures of 40°–100° C. or, if low-boiling solvents are used, at the boiling point of the solvent (under pressure, if desired). The chromium compounds will only slightly color the hydrocarbon solvent because of their relatively low solubility. However, upon addition of the organomagnesium or organoaluminium compound a dark colored solution is obtained as it reacts with the chromium compound and the colored reaction product goes into solution.

The mole ratio of the organometallic compound concerned to the chromium compound used, expressed as the atomic ratio of the Group II or III element to the chromium, should between 0.5:1 and 20:1, preferably between 1:1 and 6:1.

The vanandium halide compounds that may be used are preferably the chlorides as for example vanadium tri- tetra- or pentachloride or vanadyl chloride. Vanadyl esters having the formula $VO(OR)_3$, are particularly suitable said esters dissolve readily in hydrocarbons, as described in, notably, Chemiker Zeitung 15, Aug. 15, 1970, pp. 547–555, the disclosure of which is incorporated herein by reference. Vanadium salts of carboxylic acids suitable in the present process may be salts of mono- or polybasic acids as e.g. acetic acid, propionic acid butanoicacid, pentanoic acid and so on; oxalic acid, citric acid, malonic acid, succinic acid and so on. In addition, vanadium or vanadyl chelates of 1,3-diketo compounds may also be used when the chromium compound employed is other than a 1,3-diketo chelate. Suitable chelating 1,3-diketo compounds are those described above for the chromium chelates.

In order to dissolve the vanadium compound, it can be complexed with the organometallic compounds in the same way as described above for the chromium compounds; alternatively, use can be made of compounds which are soluble as such in the solvent which is used for depositing the compound on the inert support.

In addition to the chromium and vanadium compounds essential for the catalysts of the invention, other transition metals such as titanium can also be applied to the inert support as complexes or compounds soluble in the solvents used. The solutions of the Group II or III element/chromium complex, of the vanadium compound or Group II or III element/vanadium complex, and of the optional compounds or complexes of other transition metals can be combined with the inert inorganic support separately or in any desired sequence. Alternatively, if a metal/vanadium complex and/or complexes of other transition metals are used, they can also be prepared together in the same solvent in which the chromium complex is dissolved, if desired.

The chromium- and vanadium-containing solutions are combined with the inert support by adding the solution slowly and with stirring to a support suspended in the solvent. The complexes and compounds can be deposited on the support to form the catalyst by evaporation if the complexes do not wholly or partially deposit directly from solution. It is easily determined whether the complex has been deposited by simply noting whether the solvent has lightened or cleared as the support has become colored.

The inert inorganic support is preferably an oxide, such as silica, alumina, mixed alumina-silica, zirconium oxide, thorium oxide, or magnesium oxide. Among these oxides silica, alumina and mixed silica-alumina are preferred, and silica is most preferred. Silica is known, and can be used, in many different forms. Particularly suitable are silica xerogels with large pore volumes. If desired, the silica can in a known manner be provided with other components such as fluorine during its preparation. Alternatively, these components can be applied after the activation of the catalyst.

The support is dried, insofar as this is necessary, by heating in dry air before the transition metal compounds are deposited. Drying should be effected so that the support is free of physically bound water.

The amount of chromium, vanadium and other optional transition metals applied to the support may vary within wide limits but will generally be 0.01–10% by wt. of transition metal on the support. The atomic ratio of the chromium to the vanadium applied to the support may vary within wide limits. Generally, the ratio of chromium:vanadium will be between 1:50 and 10:1.

After the chromium complex, the vanadium compound or complex and the optional compounds or complexes of other transition metals have been combined with the support to form the catalyst, said catalyst is separated from the solvent by filtration or evaporation. If, however, the complexes and/or compounds of the transition metals are not deposited to a considerable extent on the support directly from the solution (in which case the solvent will have retained all, or substantially all, of its color) the solvent should be evaporated to enhance such deposition.

The desired catalyst can next be activated by heating it at a temperature of 200°–1200° C. in a non-reducing atmosphere, such as oxygen, air, nitrogen, carbon dioxide, or a noble gas. Preferably, this heating step is carried out in an oxidizing atmosphere, such as for instance oxygen, oxygen-containing gases or air, which atmosphere of course can also comprise air of reduced or increased oxygen content. Preferably, the supported metal compounds are heated at 400°–1200° C., more in particular at 500°–1100° C. The heating times may vary in duration from a few secnds to tens of hours or more. At temperatures in the range of 500°–1100°, the heating time will generally range from 30 minutes to 8 hours.

The optimum heating period can easily be determined experimentally by one skilled in the art, by preparing catalysts of identical composition under conditions which are identical except for the heating periods, and by subsequently determining which catalyst yields a polymer having the most desirable properties.

After cooling to ambient temperature, the catalyst is introduced into a hydrocarbon solvent which is preferably the polymerization medium. Solvents can be aliphatic or cyclic hydrocarbons, such as butane, isobutane, normal or branched pentanes, hexanes, heptanes, octanes and higher straight and/or branched saturated aliphatic hydrocarbons, cyclopentane, cyclohexane, cycloheptane, cyclooctane, etc., and mixtures thereof. In particular, fractions obtained directly or indirectly from mineral oil such as low-boiling gasoline, kerosene or gas oil, which fractions may contain aromatics but which predominantly consist of aliphatics and/or cycloaliphatics, may also be used. Aromatic hydrocarbons, such as benzene, toluene, xylenes or halogenated hydrocarbons can also be used but for practical reasons of cost and health risk, it is preferred to use aliphatic hydrocarbons or mineral oil fractions which contain little or no aromatics.

To the supported catalyst dispersed in the inert solvent, an organometallic compound of an element of Group II or III of the Periodic Table, such as beryllium, magnesium, boron, aluminium or gallium, may be added. The mole ratio of said organometallic compound to the total of transition metals applied to the support can then vary within wide limits, for instance between 0.1:1 and 200:1. Preferably, the ratio will lie between 1:1 and 40:1.

The extent to which the addition of such organometallic compounds is desirable depends on the polymerization conditions and on the polymer desired. At low catalyst concentrations and at relatively low monomer concentrations in the dispersant, the polymerization can often be started and sustained if such organometallic compounds are added. The contaminants level in monomer and dispersant also plays a role. By experiment it can easily be established whether addition of said organometallic compounds is desirable. By addition of said organometallic compunds it is also possible to modify the properties of the polyethylene to be prepared.

Suspension polymerizations using the catalysts of the invention are generally carried out at temperatures of at most 100° C. In some volatile solvents such as isobutane, the suspension polymerization can be carried out at even slightly higher temperatures to about 110° C. Preferably, however, polymerization is carried out at temperatures not exceeding 105° C. The polymerization can be carried out at temperatures as low as 50° C., but temperatures of at least 70° C., preferably 85° or higher, are chosen.

Ethylene polymerizations with the catalysts of the invention can also be executed at temperatures above 120° C., for example 150–200° C. A solution of ethylene polymer in the solvent is then obtained, which can be worked up in a known manner. The polymerization can also be carried out as a so-called gas-phase polymerization, embodiments of which are known from, for instance, U.K. Patent Specification No. 1,373,982.

The polymerization can be carried out at atmospheric pressure, but also at elevated pressure. If low-boiling solvents are used, such as butane, isobutane, or pentane, the pressure in the reactor will have to be higher than atmospheric. The monomer pressure can also be atmospheric but is preferably higher. By carrying out the polymerization at elevated monomer pressure, higher yields can be obtained. Therefore, elevated pressures up to 10 MPa will normally be desirable. Higher pressures, even up to 200 MPa or more, are possible but are usually not employed due to practical considerations.

The total polymerization pressure will range between 600 and 8000 kPa, preferably between 1200 and 5000 kPa. The pressure selected will in part depend on the polymerization temperature and the volatility of the solvent. The monomer pressure will in part be determined by balancing, on the other hand, the cost and safety aspects of an installation for relatively high pressures against, on the other hand, the polyethylene production level at high versus low pressures. The factors determining the final choice of monomer pressure are therefore economic.

The quantity of catalyst is generally chosen so that the polymerization medium contains 0.001 to 10 mmoles of transition metals per liter of solvent, and preferably 0.001 to 0.1 mmole/l.

The present process lends itself to known modifications. For example, the molecular weight may be controlled not only through temperature control but also by the addition of hydrogen or other modifying agents commonly used for such purpose.

The invention will be further explained by the following examples but is not restricted to them.

EXAMPLE I

Preparation of a chromium and vanadium-containing catalyst, using a vanadyl isopropylate aluminum complex and a chromium acetyl acetonate aluminum complex A. Conditioning of the silica material:

50 grams of silica support (EP-10/Messrs. Corsfield) is dried for 4 hours at 200° C., dry air being passed through. After replacement of the air by nitrogen the silica support is suspended in approx. 250 ml dried gasoline in a 1 liter flask.

B. Application of vanadium.

In a 100 ml flask filled with 50 ml dry gasoline, 1.24 ml vanadyl isopropylate (3.95 m) is dissolved. With stirring, 3.7 ml 3.97 M triisobutyl aluminum (TIBA) is added, yielding a strongly colored dark brown solution. With stirring, this solution is slowly trickled into the suspension of the silica support, prepared as described above. After 1 hour of stirring, the silica support is strongly colored, whereas the supernatant liquid is colorless, indicating that the vanadium has deposited on the support.

C. Application of the chromium to form the catalyst.

In 50 ml dry gasoline in a 100 ml flask, 1.68 gram (0.0048 moles) of chromium acetyl acetonate is suspended. Next, at reflux temperature, with stirring, 3.64 ml (0.0144 moles) TIBA is slowly added dropwise. The substances are allowed to react for 1 hour, after which all of the chromium acetyl acetonate has been complexed and a dark brown solution results. Finally, this solution is slowly added, with stirring, to the suspension of the vanadium-containing silica support of Example 1B. After 1 hour of stirring, the supernatant liquid is colorless, indicating that the chromium has completely deposited on the support. The excess gasoline is separated out by distillation. The dry silica now contains 0.5% by wt. of V and 0.5% by wt. of Cr.

By heating the catalyst for 8 hours at 900° C. in a stream of dry air, the catalyst is activated.

EXAMPLE II

Preparation of a chromium and vanadium-containing catalyst using a vanadium 1,3-diketo/aluminum complex and a chromium acetate/aluminum complex A. Application of vanadium.

0.85 g vanadium acetyl acetonate is suspended in 50 ml dry gasoline in a 140 ml flask. With stirring, 1.85 ml 3.97 M TIBA is slowly added to this solution. The substances are allowed to react for 1 hour at reflux temperature, after which period all of the vanadium acetyl acetonate has been converted and a dark brown solution has been formed. With stirring, this solution is slowly trickled to a suspension of a silica support obtained according to the process of Example IA. After 1 hour of stirring, the silica support is strongly colored, whereas the supernatant liquid is colorless, indicating that the vanadium has deposited on the support.

B. Application of the chromium.

0.88 g chromium (II) acetate is suspended in 50 ml dry gasoline in a 100 ml flask. Next, with stirring, at reflux temperature, 11.7 ml 3.97 M TIBA is slowly added dropwise. The substances are allowed to react for 1 hour, after which period the chromium (II) acetate has been fully converted and a dark brown solution results. This solution is finally added slowly, with stirring, to the suspension of the vanadium-containing silica support obtained in accordance with A. After 1 hour of stirring, the supernatant liquid is colorless, which indicates that the chromium has deposited completely on the support. The excess gasoline is separated out by distillation. The dry silica contains 0.25% by wt. of V and 0.30% by wt. of Cr. By heating for 8 hours at 900° C. under dry air, the catalyst is activated.

The techniques illustrated in Examples I and II may also be applied with other chromium or vanadium starting materials within the scope of the definitions given hereinabove to prepare similar chromium/vanadium catalysts.

EXAMPLE III

Polymerization of ethylene

Into a stirred autoclave (5 liters), 1.2 kg dry isobutane is introduced. After the contents of the reactor have been brought to a temperature of 97° C., hydrogen at 2.5 bar is forced in, and next ethylene, until the total pressure is 28 bar. Next, 530 mg of the activated catalyst prepared as described in Example I is added. Polymerization is carried out for 120 minutes, the total pressure in the reactor being maintained at a constant value by forcing in ethylene. The contents of the reaction vessel are kept at 97° C. during the polymerization. The polyethylene yield is 1510 grams per gram of catalyst. The melt flow index (5 kg) of the product is 0.08 g/10 minutes.

The technique of this example may generally be employed to polymerize ethylene, with or without other α-olefin comonomers with other catalysts prepared according to the methods of Example I or II.

It will thus be seen that by ths invention, highly effective chromium/vanadium catalysts may be provided by a simple technique which, importantly, need only use one 1,3-diketo chelate of either chromium or vanadium.

What is claimed is:

1. A process for preparing a chromium- and vanadium containing catalyst component, which upon activation with heat at a temperature of from 400° to 1200° C. will effect the polymerization of α-olefins, comprising:

(1) reacting in an inert solvent a chromium component selected from the group consisting of chromium carboxylates, chromium halides and chromium chelates of 1.3-diketo compounds, and (2) an organo-metallic compound of an element from Group II or III the periodic system in which hydrocarbyl groups with 1-20 carbon atoms are bound via a carbon atom to the element, and forming a solution in an inert solvent of a vanadium component selected from the group consisting of vanadium halides, vanadium oxyhalides vanadylesters having the formula $VO(OR)_3$, wherein R is a hydrocarbyl group, vanadium salts of carboxylic acids, vanadium chelates of 1.3-diketo compounds and the complexes obtained by reacting said vanadium compounds with an organo-metallic compound of an element from Group II or III of the periodic system in which hydrocarbyl groups with 1-20 carbon atoms are bound via a carbon atom to the element, provided that not more than one of said chromium- and vanadium compounds is introduced in the form of a 1.3-diketo complex; and jointly or subsequently contacting the resulting solutions with and depositing the resulting chromium- and vanadium compounds on an inert inorganic support material, and separating from said solvent the resulting catalyst component comprising said chromium and said vanadium materials deposited onto said support.

2. Process of claim 1 wherein said chromium compound is reacted with from 0.5-20 moles of said Group II or III metal hydrocarbyl compound per atom of chromium.

3. Process of claim 1 wherein the atomic ratio of chromium to vanadium ranges between 1:50 and 10:1.

4. Process of claim 1 wherein said catalyst component is thereafter activated by heating in the range 400°-1200° C.

5. Catalyst obtained according to the process of claim 4.

6. Catalyst component obtained according to the process of claims 1, 2, or 3.

* * * * *